(12) United States Patent
Mallin

(10) Patent No.: US 11,187,298 B2
(45) Date of Patent: Nov. 30, 2021

(54) EXTENSION ASSEMBLY FOR DAMPER

(71) Applicant: DRiV Automotive Inc., Lake Forest, IL (US)

(72) Inventor: Thomas Mallin, Temperance, MI (US)

(73) Assignee: DRiV Automotive Inc., Lake Forest, IL (US)

(*) Notice: Subject to any disclaimer, the term of this patent is extended or adjusted under 35 U.S.C. 154(b) by 81 days.

(21) Appl. No.: 16/671,519

(22) Filed: Nov. 1, 2019

(65) Prior Publication Data

US 2021/0131519 A1 May 6, 2021

(51) Int. Cl.
| F16F 9/32 | (2006.01) |
| F16F 9/49 | (2006.01) |
| F16F 9/18 | (2006.01) |
| B60G 17/08 | (2006.01) |
| B60G 13/08 | (2006.01) |

(52) U.S. Cl.
CPC ............... *F16F 9/49* (2013.01); *B60G 17/08* (2013.01); *F16F 9/185* (2013.01); *B60G 13/08* (2013.01); *B60G 2202/24* (2013.01); *B60G 2206/41* (2013.01); *B60G 2500/10* (2013.01)

(58) Field of Classification Search
CPC .. B60G 13/08; B60G 17/08; F16F 9/48; F16F 9/49; F16F 9/185; F16F 9/364; F16F 9/366; F16F 9/516
USPC .... 188/275, 282.7, 282.8, 288, 315, 322.13, 188/322.15, 322.22
See application file for complete search history.

(56) References Cited

U.S. PATENT DOCUMENTS

| 3,447,644 A | 6/1969 | Duckett | |
| 4,503,951 A * | 3/1985 | Imaizumi | F16F 9/516 188/280 |
| 6,408,631 B1 * | 6/2002 | Sylvia | F16F 1/328 277/902 |
| 9,605,726 B2 | 3/2017 | Baldoni et al. | |
| 9,657,803 B2 | 5/2017 | Slusarczyk et al. | |
| 9,822,837 B2 | 11/2017 | Groves et al. | |
| 10,107,352 B2 * | 10/2018 | Grzesik | F16F 9/3482 |
| 10,113,605 B2 * | 10/2018 | Cotter | F16F 9/0281 |
| 10,876,591 B2 * | 12/2020 | Mallin | F16F 9/49 |
| 2016/0223045 A1 * | 8/2016 | Baldoni | B60G 15/062 |
| 2016/0230835 A1 * | 8/2016 | Groves | F16F 9/48 |
| 2018/0058533 A1 * | 3/2018 | Bruno | B60G 17/08 |
| 2018/0119770 A1 * | 5/2018 | Bruno | F16F 9/516 |
| 2018/0223942 A1 | 8/2018 | Kus et al. | |

* cited by examiner

*Primary Examiner* — Christopher P Schwartz
(74) *Attorney, Agent, or Firm* — McGarry Bair PC

(57) ABSTRACT

An extension assembly for a damper includes an extension post having an upper end and a lower end opposite to the upper end. The extension post includes a coupling portion, a narrow portion defining a deformed section, and a wide portion disposed between the coupling portion and the narrow portion. A diameter of the wide portion is greater than a diameter of the narrow portion. The extension assembly includes a retaining member having a sleeve portion received on the narrow portion of the extension post and a plurality of support portions extending from the sleeve portion. Further, the deformed section of the narrow portion secures the retaining member to the narrow portion. The extension assembly further includes a sealing ring disposed around the retaining member. The sealing ring is disposed between the wide portion of the extension post and the plurality of support portions of the retaining member.

21 Claims, 11 Drawing Sheets

EXTENSION ASSEMBLY FOR DAMPER

TECHNICAL FIELD

The present disclosure generally relates to dampers. More particularly, the present disclosure relates to an extension assembly for a damper.

BACKGROUND

Shock absorbers/dampers are generally installed on different types of equipment, such as vehicles, to dampen vibrations during operation. For example, dampers are generally connected between a body and a suspension system of the vehicle in order to absorb the vibrations. Conventional dampers typically include one or more tubes (e.g. a monotube or a pressure tube and a reserve tube), a piston assembly, a piston rod, damping fluid, and one or more valves. The piston assembly is connected to the piston rod and travels within fluid in the pressure tube during operation to dampen axial movement of the piston rod with respect to the reserve tube. More particularly, during a rebound stroke and a compression stroke of the damper, the piston assembly can limit a flow of damping fluid between working chambers due to which the damper produces a damping force that counteracts the vibrations. By further restricting the flow of damping fluid within the working chambers, greater damping forces can be generated by the damper. Further, opposing ends of each of the piston rod and the outer tube are attached to different members or structures to dampen movements therebetween.

Some shock absorbers include a cup that is disposed within the lower working chamber of the pressure tube. The cup defines a bore that receives a second compression valve assembly. The second compression valve assembly is coupled to an extender that is disposed between the piston assembly and a first compression valve assembly. Such shock absorbers provide two distinct damping forces, i.e., a first damping force when the second compression valve assembly is outside of the bore of the cup and a second damping force when the second compression valve assembly is inside of the bore of the cup. However, such second compression valve assemblies include a complicated design and a large number of parts which can increase an overall cost of the shock absorber.

SUMMARY

In an aspect of the present disclosure, an extension assembly for a damper is provided. The extension assembly includes an extension post having an upper end and a lower end opposite to the upper end. The extension post includes a coupling portion at the upper end, a narrow portion at the lower end including a deformed section, and a wide portion disposed between the coupling portion and the narrow portion. A diameter of the wide portion is greater than a diameter of the narrow portion. The extension assembly includes a retaining member including a sleeve portion received on the narrow portion of the extension post and a plurality of support portions extending from the sleeve portion. Further, the deformed section of the narrow portion secures the retaining member to the narrow portion. The extension assembly further includes a sealing ring disposed around the retaining member. The sealing ring is disposed between the wide portion of the extension post and the plurality of support portions of the retaining member.

In another aspect of the present disclosure, a damper is provided. The damper includes a pressure tube defining a fluid chamber. The damper also includes a piston rod at least partly received within the pressure tube. The piston rod has a bottom end disposed within the pressure tube. The damper further includes a piston assembly attached to the piston rod proximate the bottom end. The piston assembly divides the fluid chamber into an upper working chamber and a lower working chamber. The damper includes an extension assembly attached to the piston rod. The extension assembly includes an extension post having an upper end disposed adjacent to the piston assembly and a lower end opposite to the upper end. The extension post includes a coupling portion at the upper end, a narrow portion at the lower end including a deformed section, and a wide portion disposed between the coupling portion and the narrow portion. A diameter of the wide portion is greater than a diameter of the narrow portion. Further, the coupling portion is attached to the piston rod. The extension assembly also includes a retaining member including a sleeve portion received on the narrow portion of the extension post and a plurality of support portions extending from the sleeve portion. Further, the deformed section of the narrow portion secures the retaining member to the narrow portion. The extension assembly further includes a sealing ring disposed around the retaining member. The sealing ring is disposed between the wide portion of the extension post and the plurality of support portions of the retaining member.

In an aspect of the present disclosure, an extension assembly for a damper is provided. The extension assembly includes an extension post having an upper end and a lower end opposite to the upper end. The extension post includes a coupling portion at the upper end, a narrow portion at the lower end including a deformed section, and a wide portion disposed between the coupling portion and the narrow portion. A diameter of the wide portion is greater than a diameter of the narrow portion. The extension assembly also includes a retaining member secured to the narrow portion by the deformed section of the narrow portion. The retaining member includes a sleeve portion received on the narrow portion of the extension post. The sleeve portion has a first end disposed adjacent to the wide portion and a second end opposite to the first end. The retaining member also includes a plurality of protrusions extending radially outwards from the sleeve portion at the first end. The retaining member further includes a plurality of support portions extending from the sleeve portion at the second end. The extension assembly also includes a sealing ring disposed around the retaining member. The sealing ring is disposed between the wide portion of the extension post and the plurality of support portions of the retaining member.

Other features and aspects of this disclosure will be apparent from the following description and the accompanying drawings.

DETAILED DESCRIPTION

Aspects of the disclosure generally relate to an extension assembly for a damper that provides a simple, efficient, and cost-effective technique for achieving hydraulic end stop compression behavior in the damper. The extension assembly includes a three piece design having an extension post, a retaining member, and a sealing ring. In an example, the extension post can be optionally attached to a bottom of a piston rod of the damper to hold a piston assembly of the damper in place. The sealing ring is axially movable between a portion of the extension post and the retaining member. Further, in some example, design features on the retaining member can also allow retention of the sealing ring within the retaining member. Further, each of the extension post, the retaining member, and the sealing ring has a simple geometry.

Figure 1:
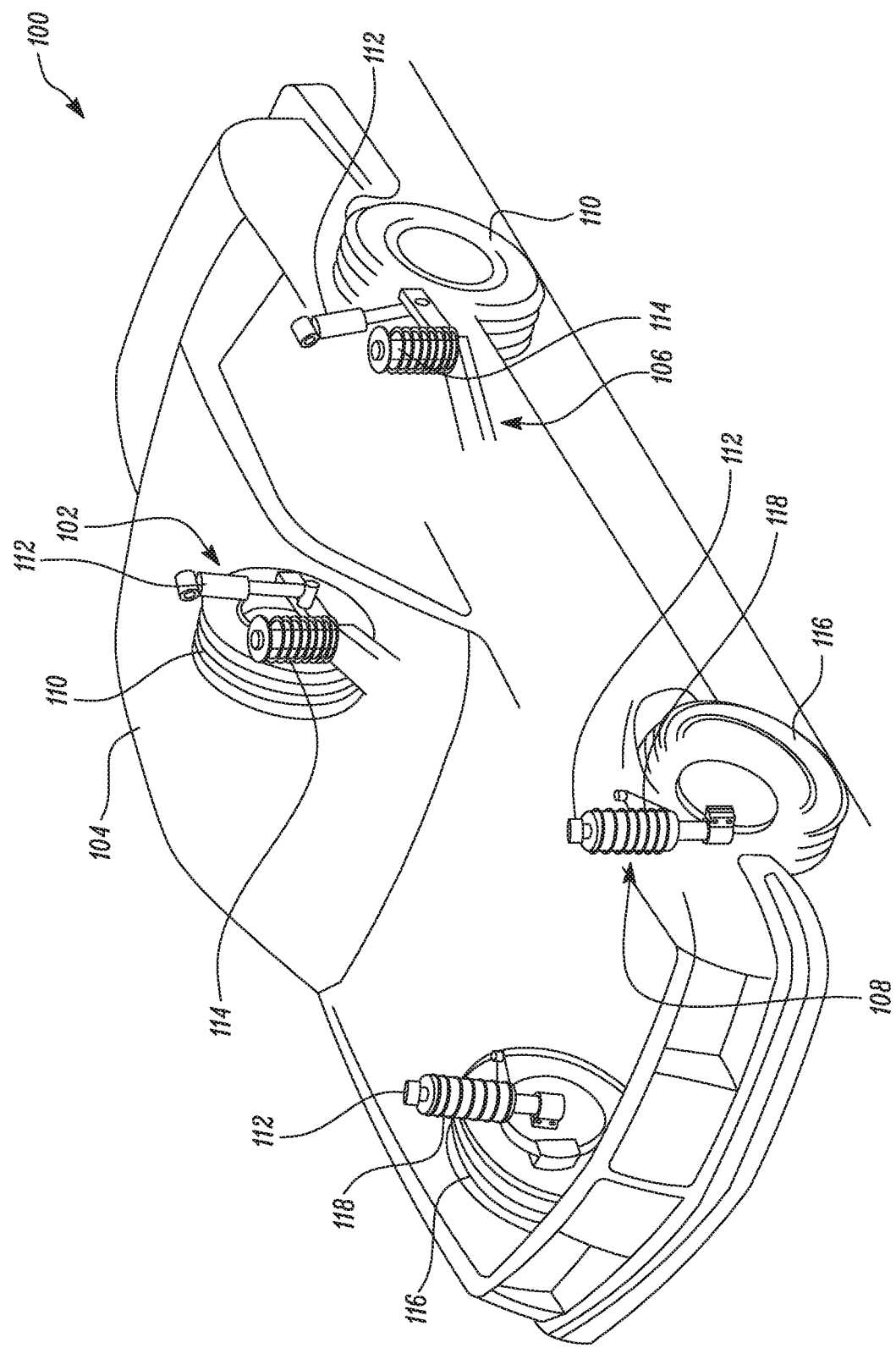
FIG. 1 is an illustration of a vehicle incorporating a suspension system, according to an aspect of the present disclosure.

Wherever possible, the same reference numbers will be used throughout the drawings to refer to same or like parts. FIG. 1 illustrates an exemplary vehicle 100 incorporating a suspension system 102 in accordance with the present disclosure. The vehicle 100 can include a vehicle driven by an internal combustion engine, an electric vehicle, or a hybrid vehicle. The vehicle 100 includes a body 104. The suspension system 102 of the vehicle 100 includes a rear suspension 106 and a front suspension 108. The rear suspension 106 includes a transversely extending rear axle assembly (not shown) adapted to operatively support a pair of rear wheels 110. The rear axle assembly is operatively connected to the body 104 by means of a pair of dampers 112 and a pair of helical coil springs 114. Similarly, the front suspension 108 includes a transversely extending front axle assembly (not shown) which operatively supports a pair of front wheels 116. The front axle assembly is operatively connected to the body 104 by means of another pair of the dampers 112 and a pair of helical coil springs 118. In an alternative embodiment, the vehicle 100 can include an independent suspension unit (not shown) for each of the four corners instead of front and rear axle assemblies.

The dampers 112 of the suspension system 102 serve to damp the relative movement of the unsprung portion (i.e., the front and rear suspensions 108, 106) and the sprung portion (i.e., the body 104) of the vehicle 100. While the vehicle 100 has been depicted as a passenger car, the dampers 112 can be used with other types of vehicles or any equipment that requires damping. Examples of vehicles include buses, trucks, off-road vehicles, and so forth. Furthermore, the term "damper 112" as used herein will refer to dampers 112 in general and will include shock absorbers, McPherson struts, and semi-active and active suspensions.

Figure 2:
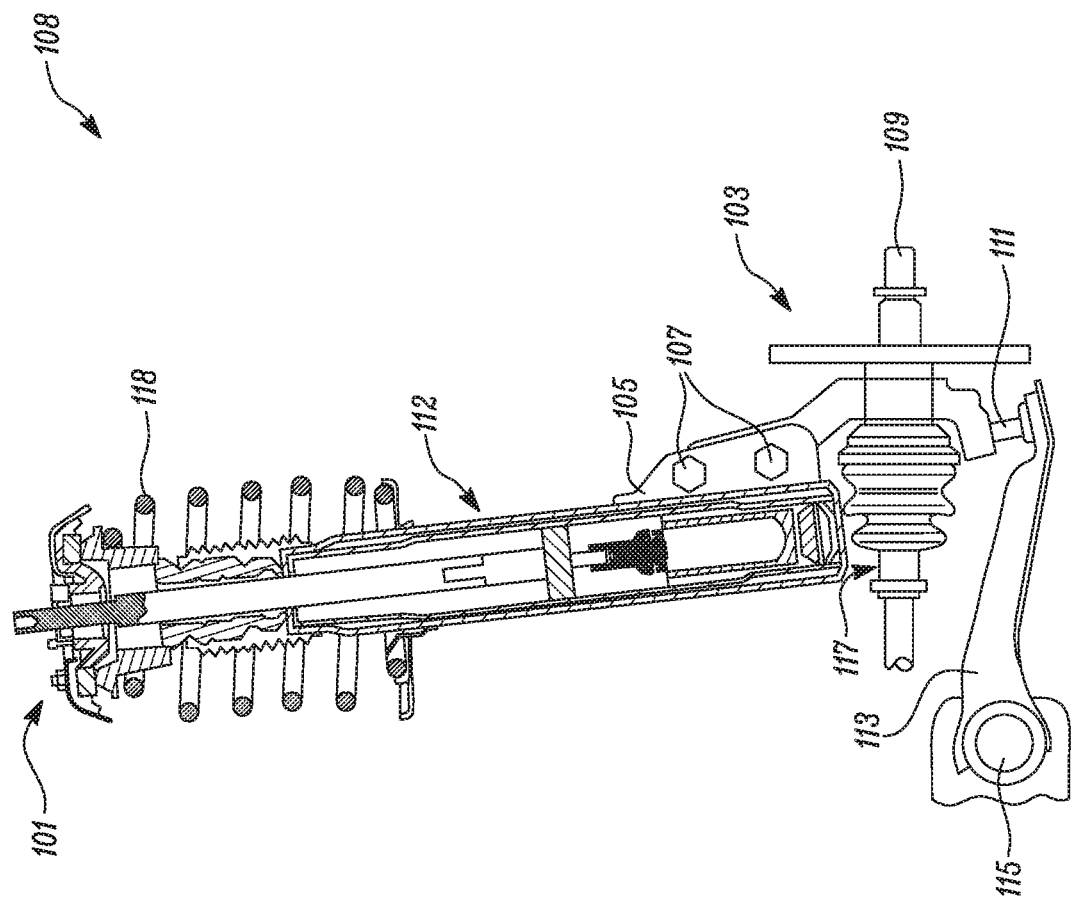
FIG. 2 is a cross-sectional view of a damper associated with the suspension system of FIG. 1, according to an aspect of the present disclosure.

FIG. 2 illustrates a cross-sectional view of the damper 112 associated with one of the wheels 110, 116 of the vehicle 100 (shown in FIG. 1). The damper 112 can be any of the four dampers 112 of the vehicle 100. In the illustrated embodiment, the damper 112 is associated with the front suspension 108. The damper 112 is typically mounted between a top mount assembly 101 and a knuckle 103. The top mount assembly 101 mounts to the body 102 of the vehicle 100 and helps support the helical spring 118.

The knuckle 103 includes a rotatably supported hub and a bearing assembly 109, to which the front wheel 116 (see FIG. 1) is operatively attached. The knuckle 103 is also typically connected to a ball joint 111 mounted to a lower control arm 113 which, in turn, is pivotally supported by a frame member 115 of the vehicle 100. A continuously variable joint member 117 translates rotational torque from vehicle transmission (not shown) to the front wheel 116 via the hub and bearing assembly 109. Thus, the front wheel 116 can rotate in operation to drive the vehicle 100, and the front suspension system 108 described above absorbs impacts and allows the front wheel 116 to move with respect to the body 102. The damper 112 includes a mounting portion 105 adapted to attach the damper 112 to the knuckle 103. While the damper 112 depicted herein is attached to the knuckle 103 with two bolts 107, those having ordinary skill in the art will appreciate that the damper 112 could be operatively attached to any suitable portion of the vehicle 100, or to any suitable member, in any suitable way, without departing from the scope of the present disclosure.

Figure 3:
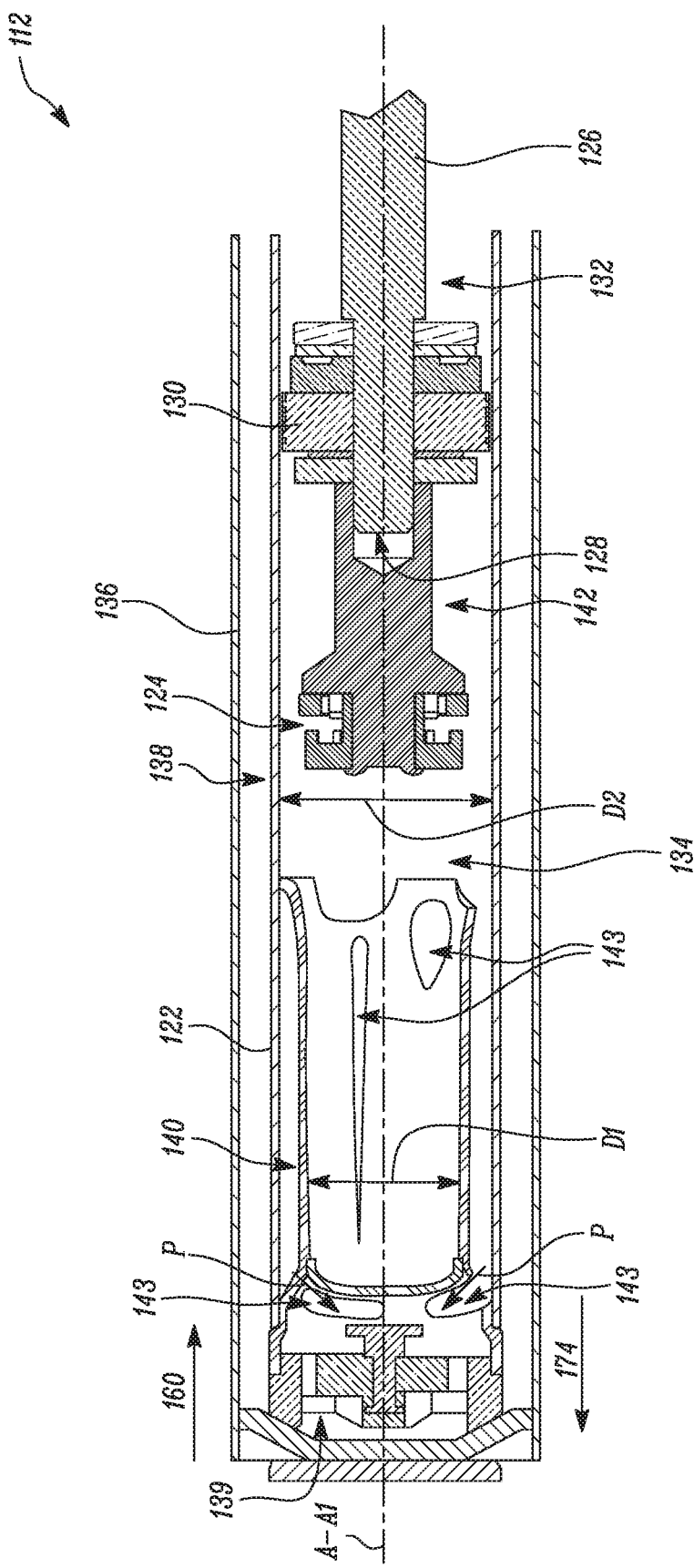
FIG. 3 is a cross-sectional view of a lower section of the damper shown in FIG. 2 depicting an extension assembly and a cup, according to an aspect of the present disclosure.

The damper 112 can include electronic components, including one or more electronic, electro-mechanical, or electro-magnetic valves, without any limitations. The damper 112 can contain a fluid which can be a hydraulic fluid or oil. Referring to FIG. 3, the damper 112 includes a pressure tube 122 defining a fluid chamber 124. The pressure tube 122 can be embodied as a monolithic pressure tube. The pressure tube 122 can be further embodied as a substantially cylindrical tube with open ends. The pressure tube 122 defines a longitudinal axis "A-A1".

Further, the damper 112 includes a piston rod 126. The piston rod 126 is at least partly received within the pressure tube 122. The piston rod 126 has a bottom end 128 disposed within the pressure tube 122. The damper 112 also includes a piston assembly 130 attached to the piston rod 126 proximate the bottom end 128. The piston assembly 130 divides the fluid chamber 124 into an upper working chamber 132 and a lower working chamber 134. The piston assembly 130 is slidably disposed within the pressure tube 122. Each of the upper and lower working chambers 132, 134 contain the fluid therein. A volume of each of the upper and lower working chambers 132, 134 varies based on a reciprocating motion of the piston assembly 130. Further, the piston assembly 130 is connected to the body 104 of the vehicle 100 (shown in FIG. 1) by the piston rod 126.

The damper 112 also includes a reserve tube 136 disposed around the pressure tube 122. In some embodiments, the reserve tube 136 is concentrically disposed around the pressure tube 122. The reserve tube 136 defines a reserve chamber 138. The reserve chamber 138 is disposed between the pressure tube 122 and the reserve tube 136. The reserve chamber 138 can receive the fluid during a compression stroke of the damper 112. A base valve 139 controls fluid flow between the lower working chamber 134 and the reserve chamber 138. Further, the damper 112 includes a cup 140 disposed within the lower working chamber 134. In some examples, the damper 112 may omit the cup 140. A diameter "D1" of the cup 140 is less than a diameter "D2" of the pressure tube 122. The cup 140 can be manufactured from plastic, a metal, or metal alloys. The damper 112 further includes an extension assembly 142 attached to the piston rod 126. The cup 140 includes a number of holes 143. Each of the holes 143 defines a leakage path "P" that allows passage of fluid therethrough.

Figure 4:
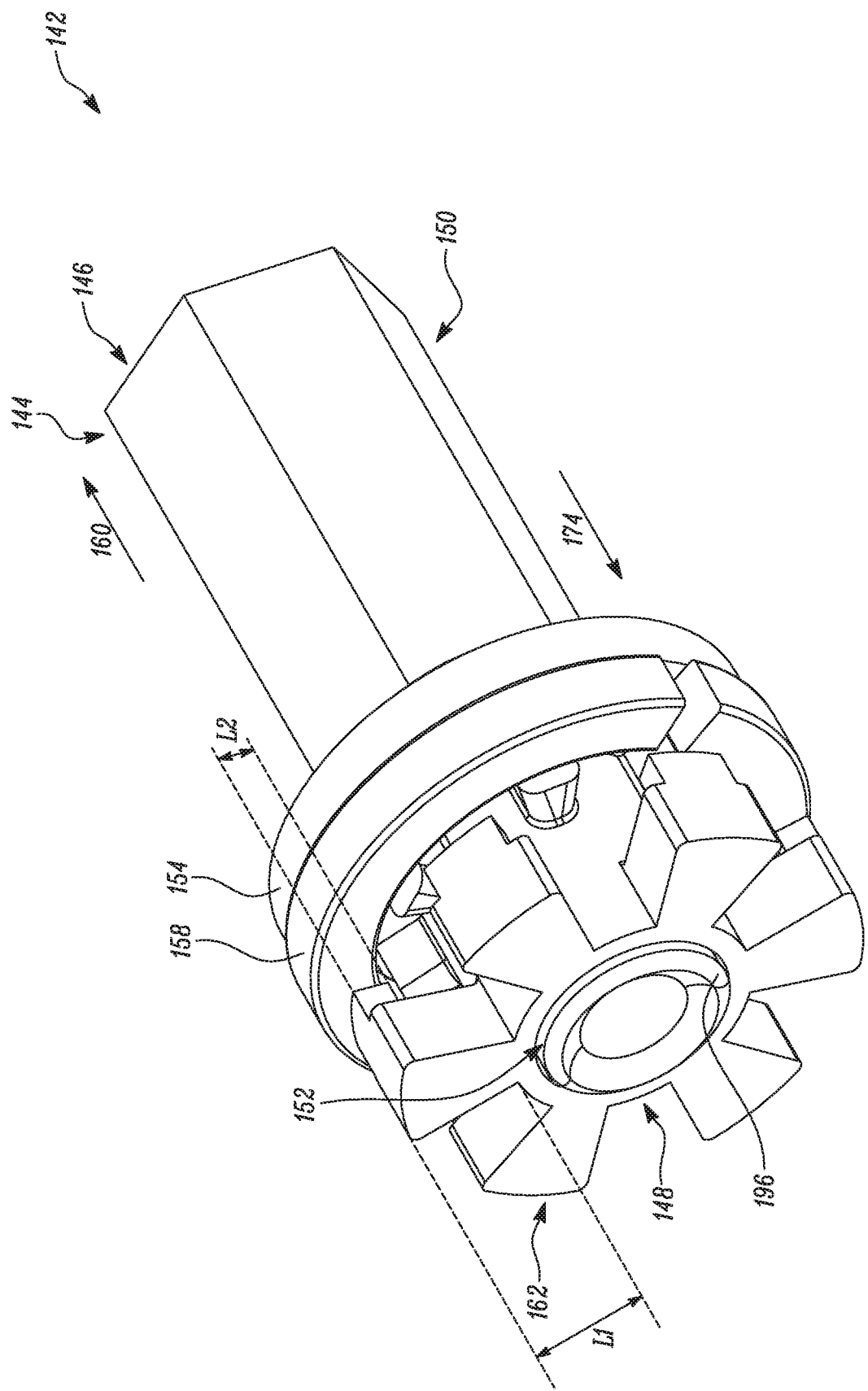
FIG. 4 is a perspective view of the extension assembly shown in FIG. 3.
Figure 5:
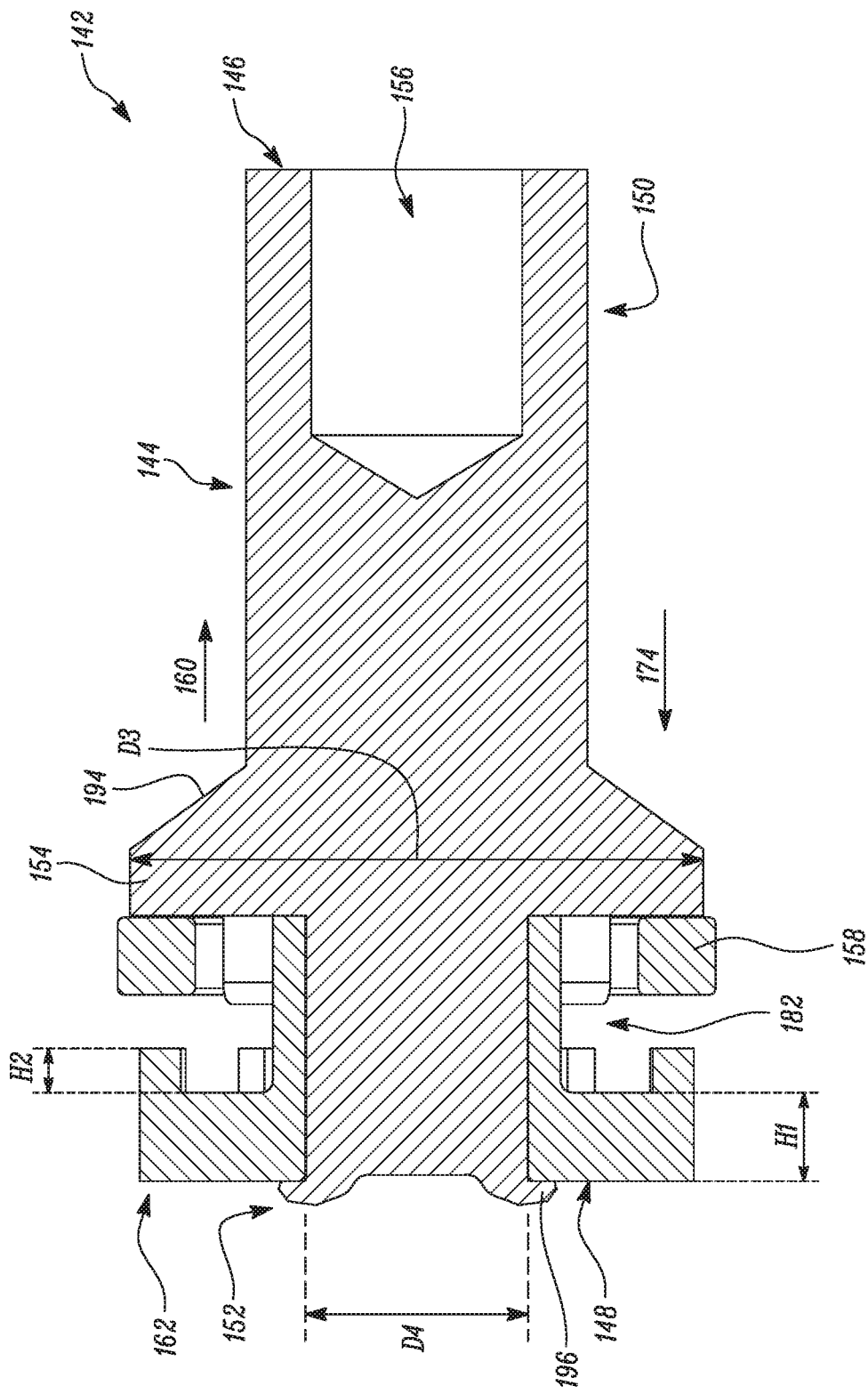
FIG. 5 is a cross-sectional view of the extension assembly shown in FIG. 3.

As shown in FIGS. 4 and 5, the extension assembly 142 includes an extension post 144 having an upper end 146 disposed adjacent to the piston assembly 130 and a lower end 148 opposite to the upper end 146. In an example, the extension post 144 can be made of metal or metal alloys. For example, the extension post 144 can be made of steel. The extension post 144 can be embodied as a cold headed part. In an example, the extension post 144 can be formed using steel that is subjected to a cold heading process. The extension post 144 includes a coupling portion 150 at the upper end 146, a narrow portion 152 at the lower end 148, and a wide portion 154 disposed between the coupling portion 150 and the narrow portion 152. The narrow portion 152 includes a deformed section 196.

The deformed section 196 of the narrow portion 152 secures the retaining member 162 to the narrow portion 152. More particularly, the retaining member 162 is held in place because of a shape of the deformed section 196. The narrow portion 152 of the extension post 144 is deformed in a manner that prevents the retaining member 162 from sliding off the narrow portion 152 of the extension post 144. In an example, the material of the extension post 144 is deformed over the retaining member 162 to form the deformed section 196 after the retaining member 162 is assembled with the extension post 144. Thus, the retaining member 162 is disposed between the wide portion 154 and the deformed section 196. Moreover, the coupling portion 150 is attached to the piston rod 126 (see FIG. 3). In the illustrated embodiment, an outer surface of the coupling portion 150 is hexagonal. Alternatively, the outer surface of the coupling portion 150 can be circular. In some cases, the extension post 144 can be made from machined hexagonal or round stock with a washer to provide the wide portion 154.

Referring now to FIG. 5, the coupling portion 150 defines a blind hole 156 at the upper end 146 of the extension post 144. The blind hole 156 at least partly receives the piston rod 126 therein. In an example, the piston rod 126 can be threadably coupled with the extension post 144. In another example, the piston rod 126 can be press-fitted to the blind hole 156. The wide portion 154 is embodied as a flared portion of the extension assembly 142. Further, the wide portion 154 defines a diameter "D3" and the narrow portion 152 defines a diameter "D4". The diameter "D3" of the wide portion 154 is greater than the diameter "D4" of the narrow portion 152. A width of the coupling portion 150 is greater than the diameter "D4" of the narrow portion 152 and less than the diameter "D3" of the wide portion 154. During the compression stroke, a sealing ring 158 moves in a first direction 160 towards the wide portion 154. Further, the wide portion 154 can limit an axial movement of the sealing ring 158 in the first direction 160 during the compression stroke so that the sealing ring 158 does not travel beyond a desired limit. The first direction 160 is parallel to the axis "A-A1". Further, the extension post 144 includes a tapered portion 194 disposed between the coupling portion 150 and the wide portion 154. The tapered portion 194 connects the coupling portion 150 and the wide portion 154.

Figure 6:
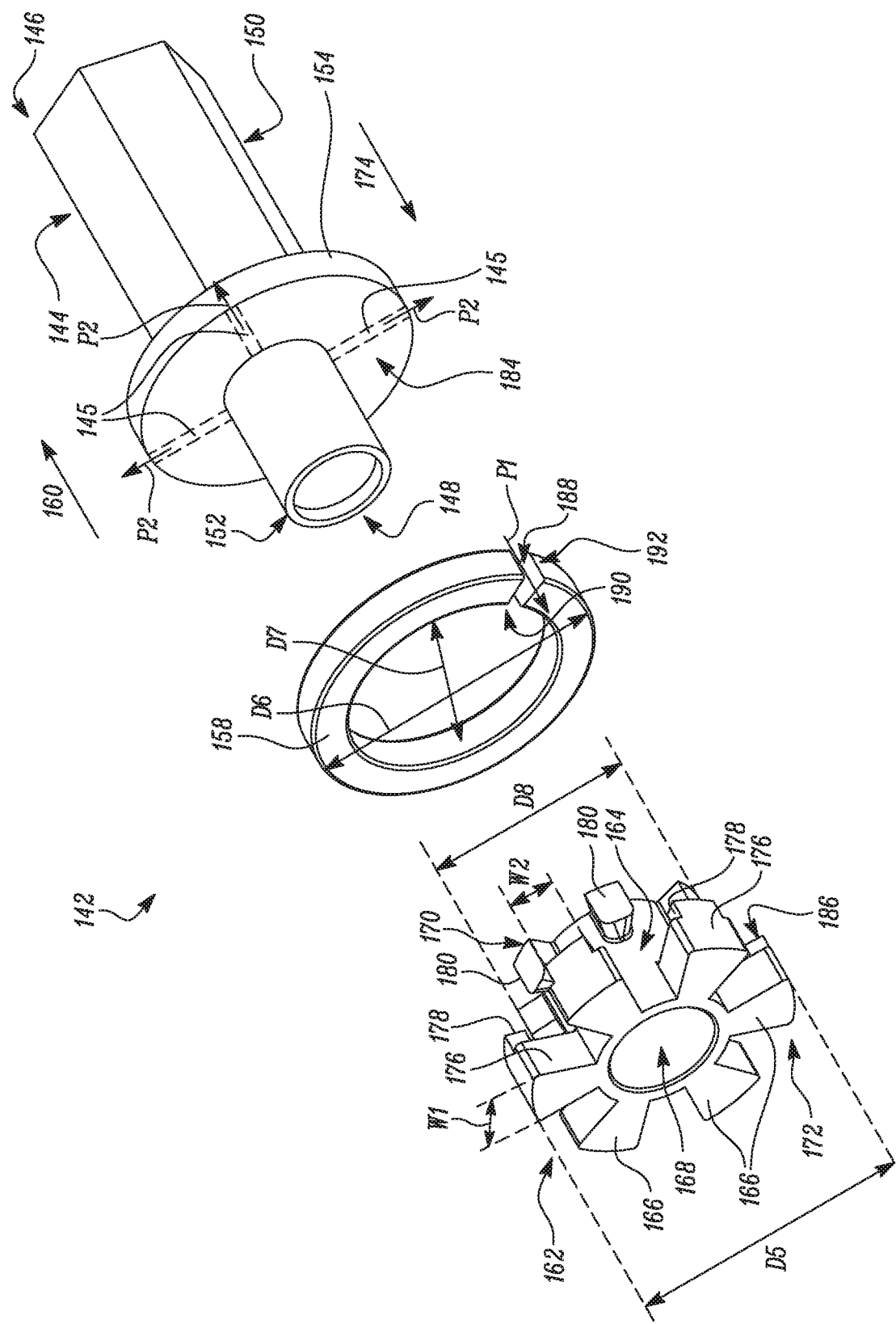
FIG. 6 is an exploded view of the extension assembly shown in FIG. 3.

As shown in FIG. 6, the damper 112 includes a retaining member 162. The retaining member 162 is embodied as a unitary part. The retaining member 162 can be manufactured using a powder metallurgical process. The retaining member 162 includes a sleeve portion 164 received on the narrow portion 152 of the extension post 144 and a plurality of support portions 166 extending from the sleeve portion 164. The sleeve portion 164 can have a hollow cylindrical shape. An outer diameter "D5" defined by the support portions 166 of the retaining member 162 is smaller than an outer diameter "D6" of the sealing ring 158. Further, the sleeve portion 164 defines a central opening 168. The central opening 168 receives a portion of the extension post 144 when the retaining member 162 is engaged with the extension post 144. Specifically, the narrow portion 152 of the extension post 144 is received at least partially within the central opening 168 of the sleeve portion 164. In alternate examples, the retaining member 162 can be press-fitted to the extension post 144 or the retaining member 162 can be threadably coupled with the extension post 144.

The sleeve portion 164 includes a first end 170 disposed adjacent to the wide portion 154 and a second end 172 opposite to the first end 170. Further, the plurality of support portions 166 are disposed at the second end 172. More particularly, the plurality of support portions 166 extend from the sleeve portion 164 at the second end 172. The support portions 166 can be circumferentially spaced apart from each other. During a rebound stroke, the sealing ring 158 moves in a second direction 174 towards the support portions 166. Further, each of the support portions 166 can limit the axial movement of the sealing ring 158 in the second direction 174 during the rebound stroke so that the sealing ring 158 does not travel beyond a desired limit. The second direction 174 is opposite to the first direction 160. The second direction 174 is parallel to the axis "A-A1". In the illustrated embodiment, the retaining member 162 includes six support portions 166. Alternatively, the retaining member 162 can include any number of support portions 166 based on application requirements. Further, the support portions 166 can include notches (not shown) and castellations (not shown) for allowing fluid flow therethrough. Moreover, a lower section of the retaining member 162 may be spoked which in turn allows lower restriction to fluid flow.

Each of the plurality of support portions 166 includes a first part 176 extending radially outwards from the sleeve portion 164, and a second part 178 extending from and perpendicular to the first part 176. Each of the first and second parts 176, 178 can be approximately trapezoidal in shape. Further, a width of the first part 176 increases radially. Similarly, a width of the second part 178 increases radially. A maximum width "W1" of the first part 176 is greater than a maximum width "W2" of the second part 178. A height "H1" (shown in FIG. 5) of the first part 176 is also greater than a height "H2" (shown in FIG. 5) of the second part 178. Moreover, a length "L1" (shown in FIG. 4) of the first part 176 is greater than a length "L2" (shown in FIG. 4) of the second part 178.

The retaining member 162 further includes a plurality of protrusions 180 extending radially outwards from the sleeve portion 164 at the first end 170. The protrusions 180 can be circumferentially spaced apart from each other. Each of the protrusions 180 can limit a radial movement of the sealing ring 158 during the compression stroke so that the sealing ring 158 remains disposed within the ring retaining groove 182. In the illustrated embodiment, the retaining member 162 includes six protrusions 180. Alternatively, the retaining member 162 can include any number of protrusions 180 based on application requirements. It should be noted that dimensions, a number, and a geometry of each of the protrusions 180 and the support portions 166 can be varied to allow distinct rates of fluid flow during the rebound stroke. Each protrusion 180 is angularly disposed between two adjacent support portions 166. The protrusions 180 are therefore angularly offset from the support portions 166. A width of each protrusion 180 increases radially.

Further, a ring retaining groove 182 (see FIG. 5) is defined in the extension assembly 142. The ring retaining groove 182 is defined between the wide portion 154 and the support portions 166. More particularly, the wide portion 154 defines an upper surface 184 of the ring retaining groove 182. Further, the support portions 166 together define a lower edge 186 of the ring retaining groove 182. In some examples, wherein the sealing ring 158 does not include an opening 188 or notches, flow channels 145 can be formed on the wide portion 154 of the extension post 144 to allow fluid flow therethrough. Thus, each of the flow channels 145 provides leakage paths "P2" for fluid flow therethrough.

The damper 112 also includes the sealing ring 158 disposed around the retaining member 162. The sealing ring 158 is disposed between the wide portion 154 of the extension post 144 and the plurality of support portions 166 of the retaining member 162. Further, the wide portion 154 of the extension post 144, the retaining member 162, and the sealing ring 158 are adapted to be received within the cup 140 (see FIG. 3). More particularly, the wide portion 154 of the extension post 144, the retaining member 162, and the sealing ring 158 are received within the cup 140 during the compression stroke of the damper 112.

Figure 10:
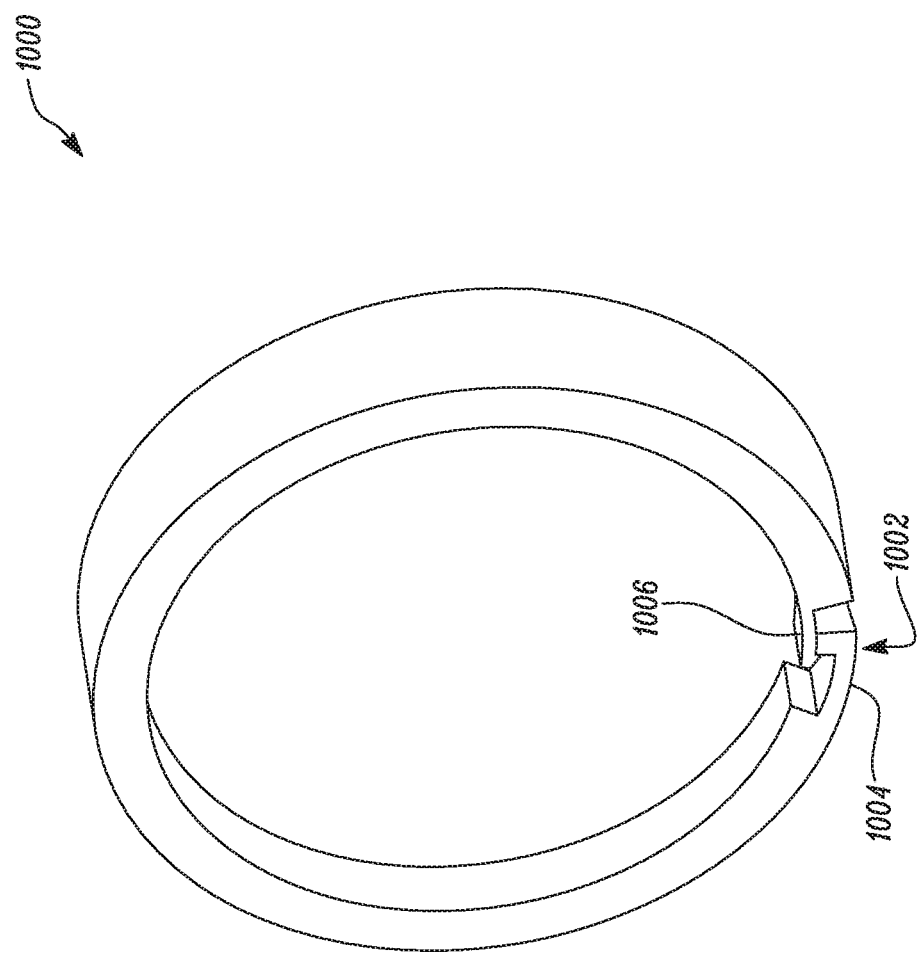
FIG. 10 is a perspective view of yet another sealing ring, according to an aspect of the preset disclosure.

The sealing ring 158 is received within the ring retaining groove 182. The sealing ring 158 is made of metal or a metal composite material. In the illustrated example, the sealing ring 158 defines at least one opening 188 therethrough. Moreover, the at least one opening 188 of the sealing ring 158 is defined between open ends 190, 192 of the sealing ring 158. The sealing ring 158 can be embodied as a C-ring. Such a design of the sealing ring 158 allows expansion and compression of the sealing ring 158 during the rebound and/or compression strokes of the damper 112. Further, the opening 188 can also allow flow of fluid therethrough during the rebound and/or compression strokes of the damper 112. More particularly, the opening 188 defines a leakage path "P1" for fluid flow therethrough. Alternatively, as seen in FIG. 10, a sealing ring 1000 can be made from plastic or a similar material.

The outer diameter "D6" of the sealing ring 158 is greater than the diameter "D3" of the wide portion 154 and the outer diameter "D5" defined by the support portions 166 of the retaining member 162. Further, an inner diameter "D7" of the sealing ring 158 is lesser than the outer diameter "D5". Moreover, the inner diameter "D7" of the sealing ring 158 is greater than an outer diameter "D8" defined by the number of protrusions 180 of the retaining member 162. The outer diameter "D5" of the sealing ring 158 and the diameter "D3" of the wide portion 154 are less than the diameter "D2" of the pressure tube 122 (shown in FIG. 3). Further, the wide portion 154 can slidingly engage with the cup 140.

The sealing ring 158 can travel along the axis "A-A1" (see FIG. 3) within the ring retaining groove 182 formed between the wide portion 154 and the support portions 166 during the rebound and compression strokes. Further, when the extension assembly 142 is received within the cup 140 during the compression stroke, the sealing ring 158 can be in contact with the wide portion 154 of the extension post 144. The sealing ring 158 can also slidingly engage with the cup 140. Further, fluid can flow through the opening 188 and passages formed between adjacent support portions 166 during the compression stroke. The extension assembly 142 can allow a restricted fluid flow during the compression stroke, thereby providing a hydraulic compression stop to the piston rod 126. Moreover, during the rebound stroke, the sealing ring 158 can be in contact with the support portions 166 of the retaining member 162. Further, the protrusions 180 can prevent the sealing ring 158 from disengaging from the ring retaining groove 182 by limiting movement of the sealing ring 158 in a radial direction. The protrusions 180 can also enable the sealing ring 150 to maintain sliding contact with the cup 140. Moreover, during the rebound stroke, the sealing ring 158 can be in contact with the support portions 166 of the retaining member 162.

Figure 7:
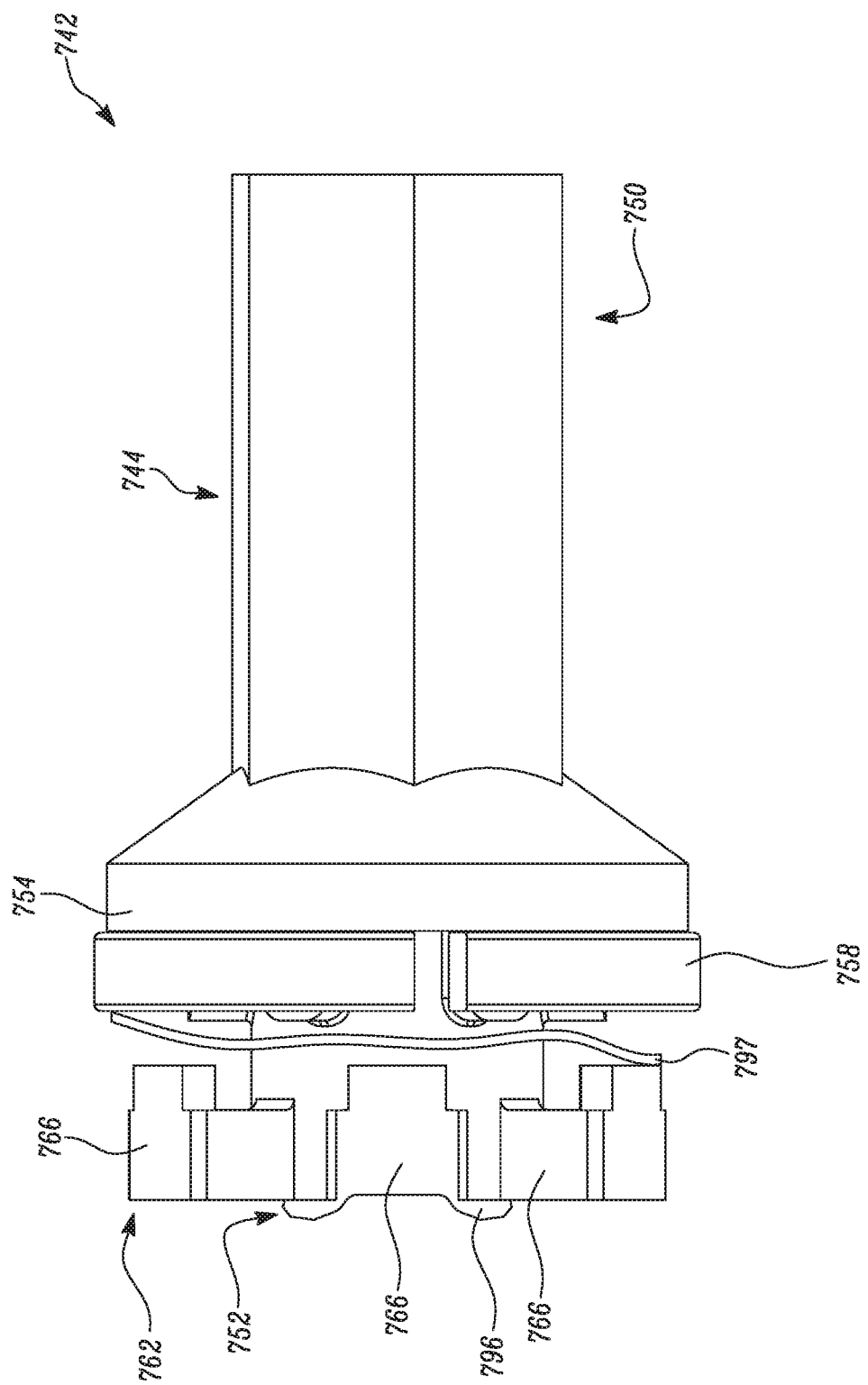
FIG. 7 is a side view of an extension assembly associated with the damper of FIG. 2, according to an aspect of the preset disclosure.

FIG. 7 illustrates an extension assembly 742 associated with the damper 112 of FIG. 2. The extension assembly 742 is similar in design and operation to the extension assembly 142 described in relation to FIGS. 4 to 6. The extension assembly 742 includes an extension post 744 that is similar design and operation to the extension post 144 described in relation to FIGS. 4 to 6. Further, the extension post 744 includes a coupling portion 750 at the upper end 746, a narrow portion 752 at the lower end 748 including a deformed section 796, and a wide portion 754 disposed between the coupling portion 750 and the narrow portion 752. The coupling portion 750, the narrow portion 752, and the wide portion 754 are similar to the coupling portion 150, the narrow portion 152, and the wide portion 154, respectively, described in relation to FIGS. 4 to 6.

Figure 8:
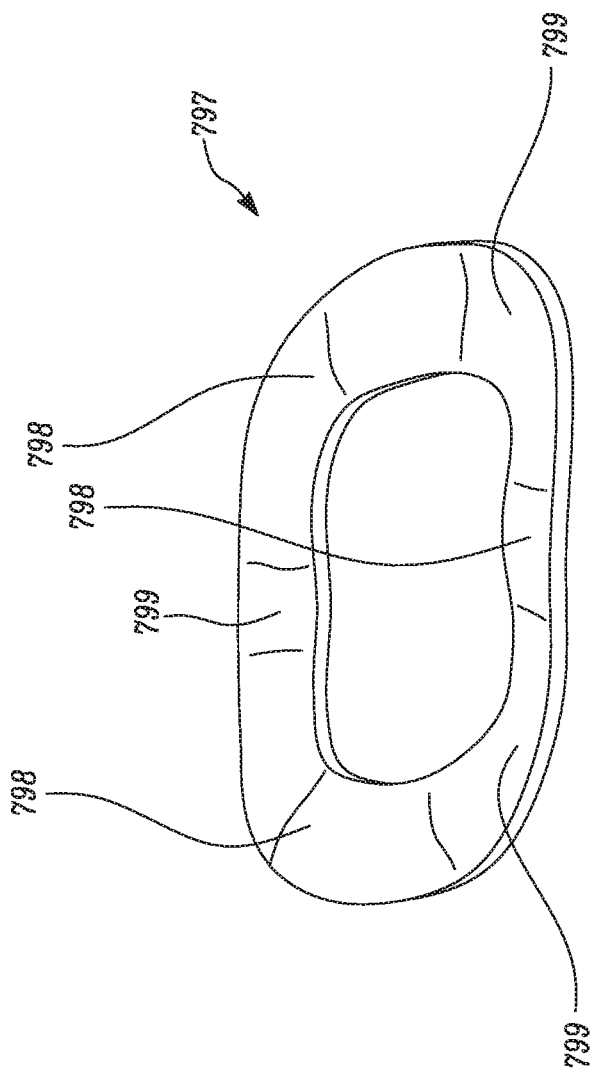
FIG. 8 is a perspective view of a wave spring associated with the extension assembly of FIG. 7.
Figure 9:
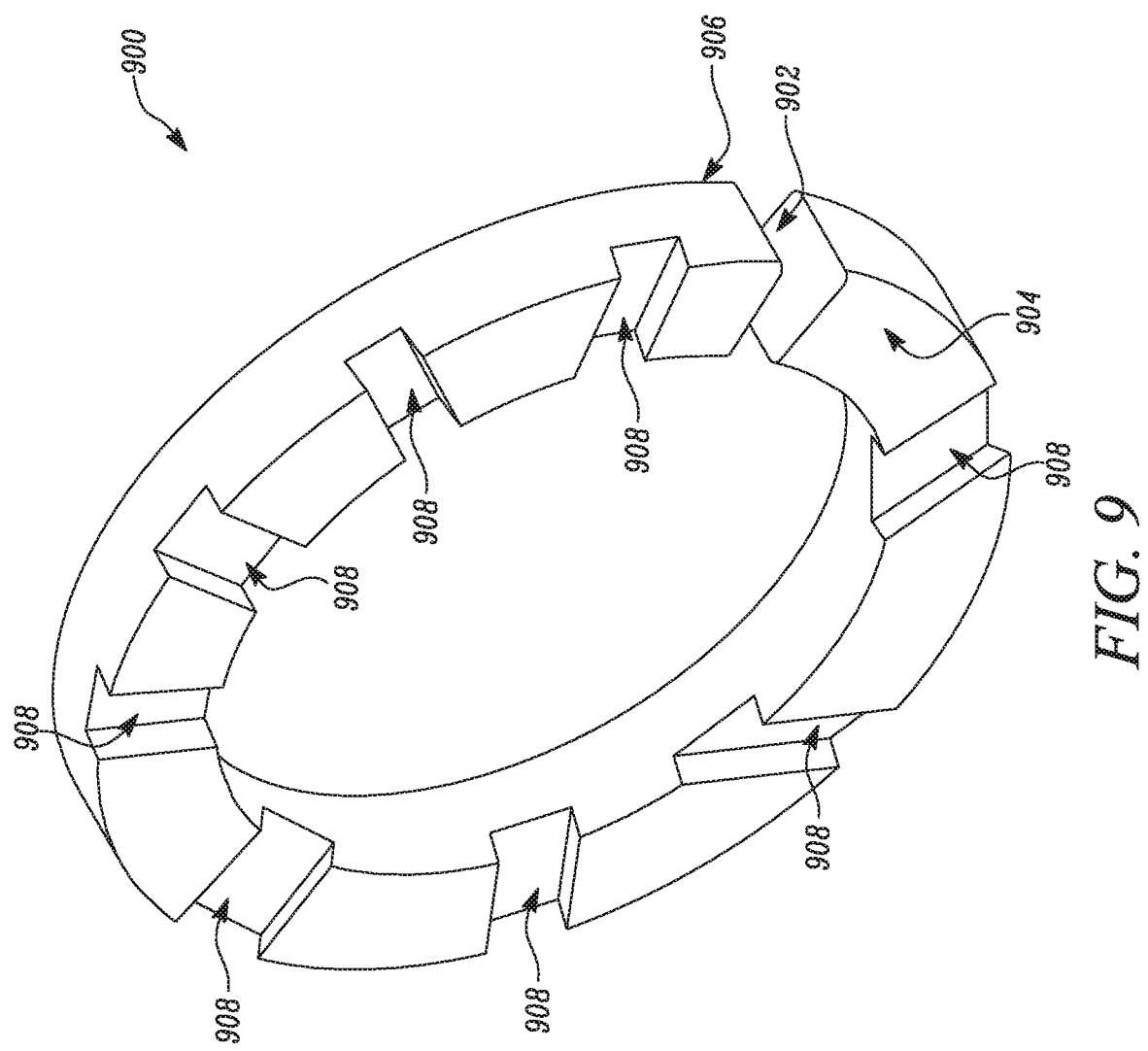
FIG. 9 is a perspective view of another sealing ring, according to an aspect of the preset disclosure.

Further, a retaining member 762 of the extension assembly 742 is similar in design and operation to the retaining member 162 described in relation to FIGS. 4 to 6. The extension assembly 742 also includes a sealing ring 758 disposed around the retaining member 762. The sealing ring 758 is similar in design and operation to the sealing ring 158 described in relation to FIGS. 4 to 6. Further, in the illustrated embodiment, the extension assembly 742 includes a wave spring 797. The wave spring 797 is disposed between the retaining member 762 and the sealing ring 758. More particularly, the wave spring 797 is disposed between support portions 766 of the retaining member 762 and the sealing ring 758. The wave spring 797 biases the sealing ring 758 towards the wide portion 754 of the extension post 744. As shown in FIG. 8, the wave spring 797 is annular in shape. Further, the wave spring 797 includes a number of convex surfaces 798 and a number of concave surfaces 799. In the illustrated example, the wave spring 797 includes three convex surfaces 798 and three concave surfaces 799, without any limitations. FIG. 9 illustrates an exemplary sealing ring 900 that can be used in place of the sealing ring 158 (see FIGS. 4, 5, and 6) in the extension assembly 142 (see FIGS. 4, 5, and 6). The sealing ring 900 is made of a metal or a metal composite material. In the illustrated example, the sealing ring 900 defines at least one opening 902 therethrough. The sealing ring 900 can be embodied as a C-ring. Such a design of the sealing ring 900 allows expansion and compression of the sealing ring 900 during the rebound and/or compression strokes of the damper 112 (shown in FIGS. 2 and 3). Further, the opening 902 can also allow flow of fluid therethrough during the rebound and/or compression strokes of the damper 112.

In the illustrated embodiment, the sealing ring 900 defines an upper surface 904 and a lower surface 906. Further, the sealing ring 900 includes a number of notches 908. The notches 908 are provided on the upper surface 904. In the illustrated embodiment, the sealing ring 900 includes eight notches 908, without any limitations. The notches 908 allow flow of fluid therethrough during the rebound and/or compression strokes of the damper 112. Further, in some example, the sealing ring 900 may also include a number of notches on the lower surface 906.

FIG. 10 illustrates the sealing ring 1000 that can be used in place of the sealing ring 158 (see FIGS. 4, 5, and 6) in the extension assembly 142 (see FIGS. 4, 5, and 6). The sealing ring 1000 is made of a plastic material or a similar material. In an example, the sealing ring 1000 can be manufactured by a molding process. Further, the sealing ring 1000 can be easily snapped around the retaining member 162 (see FIGS. 4, 5, and 6) during assembly. The sealing ring 1000 is annular in shape. The sealing ring 1000 includes a locking portion 1002. The locking portion 1002 includes a first finger 1004 that interlocks with a second finger 1006 during an assembly of the sealing ring 1000. Further, the sealing ring 1000 can also include a number of notches (not shown), as per application requirements.

Figure 11:
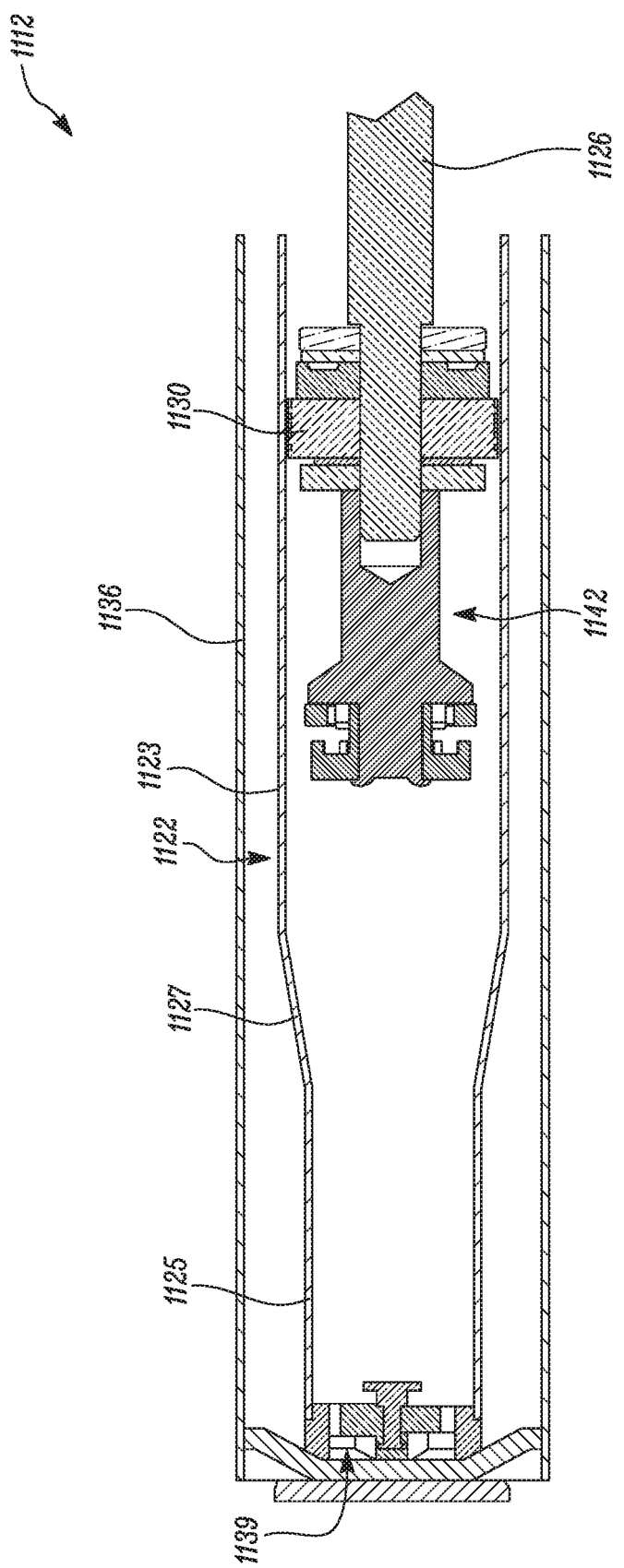
FIG. 11 is a cross-sectional view of a lower section of another damper, according to another aspect of the present disclosure.

FIG. 11 illustrates another exemplary damper 1112. The damper 1112 is similar in design and operation to the damper 112 described in relation to FIG. 3. However, the damper 1112 does not include the cup 140, as shown in FIG. 3, that is associated with the damper 112. Further, the damper 1112 includes a pressure tube 1122. The pressure tube 1122 is embodied as a monolithic pressure tube. The pressure tube 1122 may be further embodied as a substantially cylindrical tube with open ends. The pressure tube 1122 includes a primary section 1123 and a reduced-diameter section 1125. In an example, the reduced-diameter section 1125 performs the function of a hydraulic compression end stop (HCS) cup. Further, the pressure tube 1122 includes a tapered section 1127 disposed between the primary section 1123 and the reduced-diameter section 1125. The tapered section 1127 connects the primary section 1123 with the reduced-diameter section 1125.

Further, the damper 1112 includes a piston rod 1126, a piston assembly 1130, a reserve tube 1136, and a base valve 1139 similar to the piston rod 126, the piston assembly 130, the reserve tube 136, and the base valve 139, respectively, of the damper 112. The damper 1112 also includes an extension assembly 1142 that is similar in design and operation to the extension assembly 142 described in relation to FIGS. 4 to 6. The extension assembly 1142 is received within the reduced-diameter section 1125 of pressure tube 1122 during a compression stroke of the damper 1112. Further, the extension assembly 1142 can allow a restricted fluid flow during the compression stroke, thereby providing a hydraulic compression stop to the piston rod 126.

The extension assembly 142, 742, 1142 described above can provide improved damping and can include cost effective components as compared to conventional dampers including complex valve assemblies. The design of the extension assembly 142, 742, 1142 explained above includes simplified construction and is easy to manufacture. The extension assembly 142, 742, 1142 described above provides a cost effective means of achieving hydraulic compression end stop behavior. Further, the extension assembly 142, 742, 1142 described above can be incorporated in the dampers 112, 1112 at a lower cost as compared to existing extension assemblies and valve assemblies. Additionally, an application of the dampers 112, 1112 described herein is not restricted to vehicles and can be used in any application that incorporates a damper 112, 1112.

While aspects of the present disclosure have been particularly shown and described with reference to the embodiments above, it will be understood by those skilled in the art that various additional embodiments can be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. An extension assembly for a damper comprising:
   an extension post having an upper end and a lower end opposite to the upper end, the extension post comprising a coupling portion at the upper end, a narrow portion at the lower end comprising a deformed section, and a wide portion disposed between the coupling portion and the narrow portion, wherein a diameter of the wide portion is greater than a diameter of the narrow portion;
   a retaining member comprising a sleeve portion having a first end disposed adjacent to the wide portion and a second end opposite to the first end and received on the narrow portion of the extension post and a plurality of support portions extending from the second end of the sleeve portion, wherein the deformed section of the narrow portion secures the retaining member to the narrow portion; and
   a sealing ring disposed around the retaining member, wherein the sealing ring is disposed between the wide portion of the extension post and the plurality of support portions of the retaining member.

2. The extension assembly of claim 1, wherein the extension post further comprises a tapered portion disposed between the coupling portion and the wide portion.

3. The extension assembly of claim 1, wherein the coupling portion defines a blind hole at the upper end of the extension post.

4. The extension assembly of claim 1, wherein each of the plurality of support portions comprises a first part extending radially outwards from the sleeve portion, and a second part extending from and perpendicular to the first part.

5. The extension assembly of claim 1, wherein the retaining member further comprises a plurality of protrusions extending radially outwards from the sleeve portion at the first end.

6. The extension assembly of claim 1, wherein the sealing ring defines at least one opening therethrough.

7. The extension assembly of claim 6, wherein the at least one opening of the sealing ring is defined between open ends of the sealing ring.

8. A damper comprising:
   a pressure tube defining a fluid chamber;
   a piston rod at least partly received within the pressure tube, the piston rod having a bottom end disposed within the pressure tube;
   a piston assembly attached to the piston rod proximate the bottom end, the piston assembly dividing the fluid chamber into an upper working chamber and a lower working chamber; and
   an extension assembly attached to the piston rod, the extension assembly comprising:
      an extension post having an upper end disposed adjacent to the piston assembly and a lower end opposite to the upper end, the extension post comprising a coupling portion at the upper end, a narrow portion at the lower end comprising a deformed section, and a wide portion disposed between the coupling portion and the narrow portion, wherein a diameter of the wide portion is greater than a diameter of the narrow portion, and further comprising a tapered portion disposed between the coupling portion and the wide portion, and wherein the coupling portion is attached to the piston rod;

a retaining member comprising a sleeve portion received on the narrow portion of the extension post and a plurality of support portions extending from the sleeve portion, wherein the deformed section of the narrow portion secures the retaining member to the narrow portion; and a sealing ring disposed around the retaining member, wherein the sealing ring is disposed between the wide portion of the extension post and the plurality of support portions of the retaining member.

9. The damper of claim 8 further comprising a cup disposed within the lower working chamber, wherein a diameter of the cup is less than a diameter of the pressure tube, and wherein the wide portion of the extension post, the retaining member, and the sealing ring are adapted to be received within the cup.

10. The damper of claim 8, wherein the coupling portion defines a blind hole at the upper end of the extension post, the blind hole at least partly receiving the piston rod therein.

11. The damper of claim 8, wherein each of the plurality of support portions comprises a first part extending radially outwards from the sleeve portion, and a second part extending from and perpendicular to the first part.

12. The damper of claim 8, wherein the sleeve portion has a first end disposed adjacent to the wide portion and a second end opposite to the first end, wherein the plurality of support portions are disposed at the second end.

13. The damper of claim 12, wherein the retaining member further comprises a plurality of protrusions extending radially outwards from the sleeve portion at the first end.

14. The damper of claim 8, wherein the sealing ring defines at least one opening therethrough between open ends of the sealing ring.

15. An extension assembly for a damper comprising:
an extension post having an upper end and a lower end opposite to the upper end, the extension post comprising a coupling portion at the upper end, a narrow portion at the lower end comprising a deformed section, and a wide portion disposed between the coupling portion and the narrow portion, wherein a diameter of the wide portion is greater than a diameter of the narrow portion;

a retaining member secured to the narrow portion by the deformed section of the narrow portion, the retaining member comprising:
a sleeve portion received on the narrow portion of the extension post, the sleeve portion having a first end disposed adjacent to the wide portion and a second end opposite to the first end;
a plurality of protrusions extending radially outwards from the sleeve portion at the first end; and
a plurality of support portions extending from the sleeve portion at the second end; and
a sealing ring disposed around the retaining member, wherein the sealing ring is disposed between the wide portion of the extension post and the plurality of support portions of the retaining member.

16. The extension assembly of claim 15, wherein the extension post further comprises a tapered portion disposed between the coupling portion and the wide portion.

17. The extension assembly of claim 15, wherein the coupling portion defines a blind hole at the upper end of the extension post.

18. The extension assembly of claim 15, wherein each of the plurality of support portions comprises a first part extending radially outwards from the sleeve portion, and a second part extending from and perpendicular to the first part.

19. The extension assembly of claim 15, wherein the sealing ring defines at least one opening between open ends of the sealing ring.

20. An extension assembly for a damper comprising:
an extension post having an upper end and a lower end opposite to the upper end, the extension post comprising a coupling portion at the upper end, a narrow portion at the lower end comprising a deformed section, and a wide portion disposed between the coupling portion and the narrow portion, wherein a diameter of the wide portion is greater than a diameter of the narrow portion and further comprising a tapered portion disposed between the coupling portion and the wide portion;

a retaining member comprising a sleeve portion received on the narrow portion of the extension post and a plurality of support portions extending from the sleeve portion, wherein the deformed section of the narrow portion secures the retaining member to the narrow portion; and a sealing ring disposed around the retaining member, wherein the sealing ring is disposed between the wide portion of the extension post and the plurality of support portions of the retaining member.

21. A damper comprising:
a pressure tube defining a fluid chamber;
a piston rod at least partly received within the pressure tube, the piston rod having a bottom end disposed within the pressure tube;
a piston assembly attached to the piston rod proximate the bottom end, the piston assembly dividing the fluid chamber into an upper working chamber and a lower working chamber; and
an extension assembly attached to the piston rod, the extension assembly comprising:
an extension post having an upper end disposed adjacent to the piston assembly and a lower end opposite to the upper end, the extension post comprising a coupling portion at the upper end, a narrow portion at the lower end comprising a deformed section, and a wide portion disposed between the coupling portion and the narrow portion, wherein a diameter of the wide portion is greater than a diameter of the narrow portion, and wherein the coupling portion is attached to the piston rod;
a retaining member comprising a sleeve portion having a first end disposed adjacent to the wide portion and a second end opposite to the first end and received on the narrow portion of the extension post and a plurality of support portions extending from the second end of the sleeve portion, wherein the deformed section of the narrow portion secures the retaining member to the narrow portion; and
a sealing ring disposed around the retaining member, wherein the sealing ring is disposed between the wide portion of the extension post and the plurality of support portions of the retaining member.

* * * * *